United States Patent [19]
Roberson et al.

[11] Patent Number: 5,917,283
[45] Date of Patent: Jun. 29, 1999

[54] PLASMA ADDRESSED LIQUID CRYSTAL DISPLAY PANEL WITH INTEGRATED SOURCE OF HYDROGEN

[75] Inventors: Mark W. Roberson, Cary, N.C.; Michael D. Wagner, Tracy, Calif.; Wayne R. Kurowski, Portland, Oreg.

[73] Assignee: Tektronix, Inc., Wilsonville, Oreg.

[21] Appl. No.: 08/925,238

[22] Filed: Sep. 8, 1997

Related U.S. Application Data

[60] Provisional application No. 60/026,662, Sep. 30, 1996.
[51] Int. Cl.$^6$ ..................................................... H01J 61/12
[52] U.S. Cl. .......................... 313/582; 313/573; 313/493; 313/637; 345/60; 345/87
[58] Field of Search .................................. 313/582, 573, 313/574, 484, 491, 493, 629, 547, 643, 637; 345/60.87

[56] References Cited

U.S. PATENT DOCUMENTS

| | | | |
|---|---|---|---|
| 5,420,707 | 5/1995 | Miyazaki | 313/582 X |
| 5,440,201 | 8/1995 | Martin et al. | 345/60 X |
| 5,469,021 | 11/1995 | Lepselter | 313/637 X |
| 5,777,436 | 7/1998 | Lepselter | 313/582 |

*Primary Examiner*—Ashok Patel
*Attorney, Agent, or Firm*—John D. Winkelman; John Smith-Hill

[57] ABSTRACT

A channel subassembly for a PALC display panel comprises a channel member defining an array of interconnected channels, a cover sheet extending over the channels and sealed to the channel member, whereby the channel member and the cover sheet define a sealed volume, a mixture of an ionizable gas and hydrogen in the sealed volume, and a quantity of an alloy composed of about 33 wt % Zr, about 33 wt % Fe and about 33 wt % V in communication with the sealed volume.

6 Claims, 4 Drawing Sheets

PLASMA ADDRESSED LIQUID CRYSTAL DISPLAY PANEL WITH INTEGRATED SOURCE OF HYDROGEN

CROSS REFERENCED TO RELATED APPLICATIONS

This application claims the benefit of U.S. Provisional Application Ser. No. 60/026,662, filed Sep. 30, 1996.

BACKGROUND OF THE INVENTION

This invention relates to a plasma addressed liquid crystal (PALC) display panel having an integrated source of hydrogen.

U.S. Pat. No. 5,077,553 discloses apparatus for addressing data storage elements. A practical implementation of the apparatus shown in U.S. Pat. No. 5,077,553 is illustrated schematically in FIG. 4 of the accompanying drawings.

The display panel shown in FIG. 4 comprises, in sequence from below, a polarizer 2, a channel member 4, a cover sheet 6 (commonly known as a microsheet), a layer 10 of electro-optic material, an array of parallel transparent data drive electrodes (only one of which, designated 12, can be seen in the view shown in FIG. 4), an upper substrate 14 carrying the data drive electrodes, and an upper polarizer 16. The channel member 4 is typically made of glass and is formed with multiple parallel channels 20 in its upper main face. The channels 20, which are separated by ribs 22, are filled with an ionizable gas, such as helium. An anode 24 and a cathode are provided in each of the channels 20. The channels 20 are orthogonal to the data drive electrodes and the region where a data drive electrode crosses a channel (when viewed perpendicularly to the panel) forms a discrete panel element 28. Each panel element can be considered to include elements of the layer 10 and the lower and upper polarizers 2 and 16. In the case of a color display panel, the panel elements include color filters (not shown) between the layer 10 and the upper substrate 14. The region of the upper surface of the display panel that bounds the panel element constitutes a single pixel 30 of the display panel.

When the anode in one of the channels is connected to ground and a suitable negative voltage is applied to the cathode in that channel, the gas in the channel forms a plasma that provides a conductive path at the lower surface of the cover sheet 6. If a data drive electrode is at ground potential, there is no significant electric field in the volume element of electro-optic material in the panel element at the crossing of the channel and the data drive electrode and the panel element is considered to be off, whereas if the data drive electrode is at a substantially different potential from ground, there is a substantial electric field in that volume element of electro-optic material and the panel element is considered to be on.

It will be assumed in the following description, without intending to limit the scope of the claims, that the lower polarizer 2 is a linear polarizer and that its plane of polarization can be arbitrarily designated as being at 0° relative to a reference plane, that the upper polarizer 16 is a linear polarizer having its plane of polarization at 90°, and that the electro-optic material is a twisted nematic liquid crystal material that rotates the plane of polarization of linearly polarized light passing therethrough by an angle that is a function of the electric field in the liquid crystal material. When the panel element is off, the angle of rotation is 90°; and when the panel element is on, the angle of rotation is zero.

The panel is illuminated from the underside by an extended light source (not shown) that emits unpolarized white light. A rear glass diffuser 18 having a scattering surface may be positioned between the light source and the panel in order to provide uniform illumination of the panel. The light that enters a given panel element from the source is linearly polarized at 0° by the lower polarizer 2 and passes sequentially through the channel member 4, the channel 20, the cover sheet 6, and the volume element of the liquid crystal material toward the upper polarizer 16 and a viewer 32. If the panel element is off, the plane of polarization of linearly polarized light passing through the volume element of liquid crystal material is rotated through 90°, and therefore the plane of polarization of light incident on the upper polarizer element is at 90°. The light is passed by the upper polarizer element and the pixel is illuminated. If, on the other hand, the panel element is on, the plane of polarization of the linearly polarized light is not changed on passing through the volume element of liquid crystal material. The plane of polarization of light incident on the upper polarizer element is at 0° and therefore the light is blocked by the upper polarizer element and the pixel is dark. If the electric field in the volume element of liquid crystal material is intermediate the values associated with the panel element being off and on, light is passed by the upper polarizer element with an intensity that depends on the electric field, allowing a gray scale to be displayed.

When the PALC display panel disclosed in U.S. Pat. No. 5,077,553 is used as a raster scan display panel for displaying an NTSC video signal, the panel is oriented so that the channels extend horizontally and the data drive electrodes extend vertically. The first active line of a frame of the video signal is sampled. A negative-going strobe pulse is applied to the cathode in the first channel to establish a plasma in the first channel, and the data drive electrodes are driven to voltage levels that depend on the respective sample values. In each panel element along the first channel, an electric field that establishes the state of the panel element is created between the data drive electrode and the lower surface of the cover sheet. The strobe pulse is removed, and the plasma is extinguished, but the electric field persists, maintaining the state of the panel element until the first channel is again addressed, on the next frame of the video signal. This sequence of operations is repeated in order for the remaining active lines of the frame and the remaining channels of the display panel.

The plasma that was created in the first channel is not extinguished instantaneously when the strobe pulse is removed, but decays over a finite interval. If the voltages for the next line of video data are applied to the data drive electrodes before the plasma in the first channel is fully decayed, the electric field that is created in a panel element along the first channel will not have the proper value, and this will generally result in a loss of image quality. Therefore, it is necessary that the plasma created in response to a previous strobe pulse shall be fully extinguished before the data drive electrodes are driven to the voltages for the next line of video.

A plasma is considered to have decayed fully (or to be fully extinguished) if the voltage stored by the active display element is at least 90 percent of the voltage that would have been stored if the gas in the inactive channel had not been ionized.

It can be shown that in the event that the display panel disclosed in U.S. Pat. No. 5,077,553 is used to display a video signal composed of 480 lines addressed at a frame rate of 60 Hz, the time that elapses between removing the strobe pulse in one channel and driving the data drive electrodes for the next line of the display is approximately 30 $\mu$s.

Accordingly, the plasma created in a given channel must decay within approximately 30 μs after the strobe pulse is removed.

Helium is an advantageous choice for the gas to use in a plasma addressed liquid crystal display panel because it is inert and therefore does not react with the electrodes in the plasma channels. Also, helium is a favorable choice with respect to sputtering damage because the helium ions are light. However, use of helium as the ionizable gas in a PALC display panel is subject to the disadvantage that on recombination of a helium ion with an electron, the helium atom does not always pass immediately to the ground state, but it may remain for a significant period of time in a metastable state. If a metastable helium atom receives energy, e.g. from a collision with an electron or with another helium atom, the metastable helium atom might undergo secondary ionization, thus delaying complete extinction of the plasma.

One mechanism by which a metastable helium atom in a PALC display panel decays is through collision with the walls of the channel. In the case of a plasma addressed liquid crystal display panel suitable for an NTSC display, the dimensions of the channels are such that metastable helium atoms will collide with the walls of the channel and revert to the ground state at a sufficient rate that the plasma will be considered to be fully extinguished within 30 μs after removal of the strobe pulse. Accordingly, the existence of the metastable state does not significantly degrade operation of a plasma addressed liquid crystal display panel when driven by an NTSC signal.

In the event that the PALC display panel is to be used to provide an HDTV display, the number of lines of the display and the frequency at which the frame is refreshed are such that the plasma in a given channel must be reliably extinguished within about 8–16 μs after the pulse is removed from the cathode. If helium alone is used as the gas in the panel, the existence and persistence of the metastable states impairs the viewability of the display.

It has been found that if a suitable dopant gas is present in the panel, the extinction of the plasma is accelerated. The mechanism by which the dopant gas operates is not fully understood, but it is believed that it reduces the number of metastable atoms formed and/or hastens the decay of the metastable atoms. Several dopant gases have been evaluated.

Hydrogen is a dopant gas that is effective to accelerate extinction of the plasma. See U.S. provisional patent application Ser. No. 60/022,002, the disclosure of which is hereby incorporated by reference herein. The hydrogen ion is light and so sputtering damage to the cathodes is small.

It has been found that a satisfactory HDTV image is displayed if hydrogen is present in a helium filling at a concentration, measured in partial pressure, in the range from about 0.01 percent to 20 percent in a total chamber pressure between 50 mB and 500 mB. Thus, the partial pressure of hydrogen is between about 0.005 mB and about 100 mB.

An HDTV display panel would typically have 1,200 channels. In the case of the channels each being about 40 cm long, the total volume of the channels would be about 0.05 liters. If the total pressure in the chamber is 200 mB and the partial pressure of hydrogen is 2 mB, the quantity of hydrogen present at 300 K is about 0.1 mB liter (1,000 mB liter is the quantity of gas at standard temperature and pressure occupying one liter). A possible disadvantage to use of hydrogen as the dopant gas is that the hydrogen ion is highly reactive, and therefore the hydrogen is consumed by reaction with the electrode material. It has been estimated that hydrogen is consumed by reaction with the electrode material at the rate of $1 \times 10^{-6}$ mB liter/hour/cm channel length. The maximum rate of consumption for such an HDTV display panel would be about $50 \times 10^{-3}$ mB liter/hour and 0.1 mB liter would therefore be consumed in about two hours. Thus, the viewability of the panel would deteriorate to an unacceptable degree after only a few hours of operation. If the total pressure were increased to 240 mB and the partial pressure of hydrogen were increased to 36 mB, so as to keep the partial pressure of helium about the same, the quantity of hydrogen would be about 1.8 mB liter, which would be consumed in approximately 36 hours.

It is generally accepted that in order for a television display panel to be commercially acceptable, it must operate for at least 10,000 hours (corresponding to a useful life of about 10 years) without significant degradation in the quality of the display. In order to maintain the partial pressure of hydrogen at 36 mB over 10,000 hours of use, a total hydrogen capacity of 500 mB liter would be needed, having a mass of about 60 mg, or about 280 times the amount needed to charge the panel to a partial pressure of 36 mB. For a panel having channels of length other than 40 cm, the mass of hydrogen required to maintain the partial pressure of hydrogen at 36 mB over 10,000 hours of use scales in accordance with the length of the channels.

U.S. provisional patent application Ser. No. 60/022,002 discloses that the concentration of hydrogen in a PALC display panel can be maintained by providing a quantity of hydrogen storage material, which reversibly absorbs and releases hydrogen, in communication with the plasma channels of the panel.

G. Bonizzoni, A. Conte, G. Gatto, G. Gervasini, F. Ghezzi and M. Rigamonti, Tritium Storage Plant Based on a Combination of St 707 and St 737 Getter Alloy Beds for High Field Fusion Machines, 11th International Vacuum Congress, Cologne (Germany), Sep. 25–29, 1989, discloses that the alloy St 737 (Zr 33%, Fe 33%, V 33%, by weight) may be used as a tritium getter for storage and release of tritium. The alloy St 737 is commercially available from SAES Getters S.p.A. of Milan, Italy.

SUMMARY OF THE INVENTION

In accordance with a first aspect of the present invention there is provided a channel subassembly for a PALC panel, comprising a channel member defining an array of interconnected channels, a cover sheet extending over the channels and sealed to the channel member, whereby the channel member and the cover sheet define a sealed volume, a mixture of an ionizable gas and hydrogen in said sealed volume, and a quantity of an alloy composed of about 33 wt % Zr, about 33 wt % Fe and about 33 wt % V in communication with the sealed volume.

In accordance with a second aspect of the present invention there is provided a channel subassembly for a PALC panel comprising a channel member having a periphery and defining an array of parallel interconnected channels, a cover sheet extending over the channels and sealed to the channel member, whereby the channel member and the cover sheet define a sealed volume, helium in said sealed volume at a partial pressure within the range from about 50 mB to about 350 mB, a quantity of an alloy composed of about 33 wt % Zr, about 33 wt % Fe and about 33 wt % V in communication with the sealed volume, and hydrogen in said sealed volume at a partial pressure within the range from about 0.02 mB to about 36 mB.

In accordance with a third aspect of the present invention there is provided an improved method of manufacturing a channel subassembly for a PALC panel comprising (a) providing a channel member that defines an array of interconnected plasma channels having a pair of electrodes exposed in each channel for selectively ionizing gas in the respective channel, (b) placing a cover sheet over the channels and attaching the cover sheet to the channel member whereby the channel member and the cover sheet define a chamber, (c) heating the channel subassembly to a temperature of at least about 200° C., (d) exhausting gas from the chamber, (e) introducing an ionizable gas into said chamber, and (f) sealing said chamber, wherein the improvement comprises between step (a) and step (c), providing a quantity of an alloy composed of about 33 wt % Zr, about 33 wt % Fe and about 33 wt % V in fluid flow communication with said chamber, and between step (c) and step (f), introducing hydrogen into said chamber.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
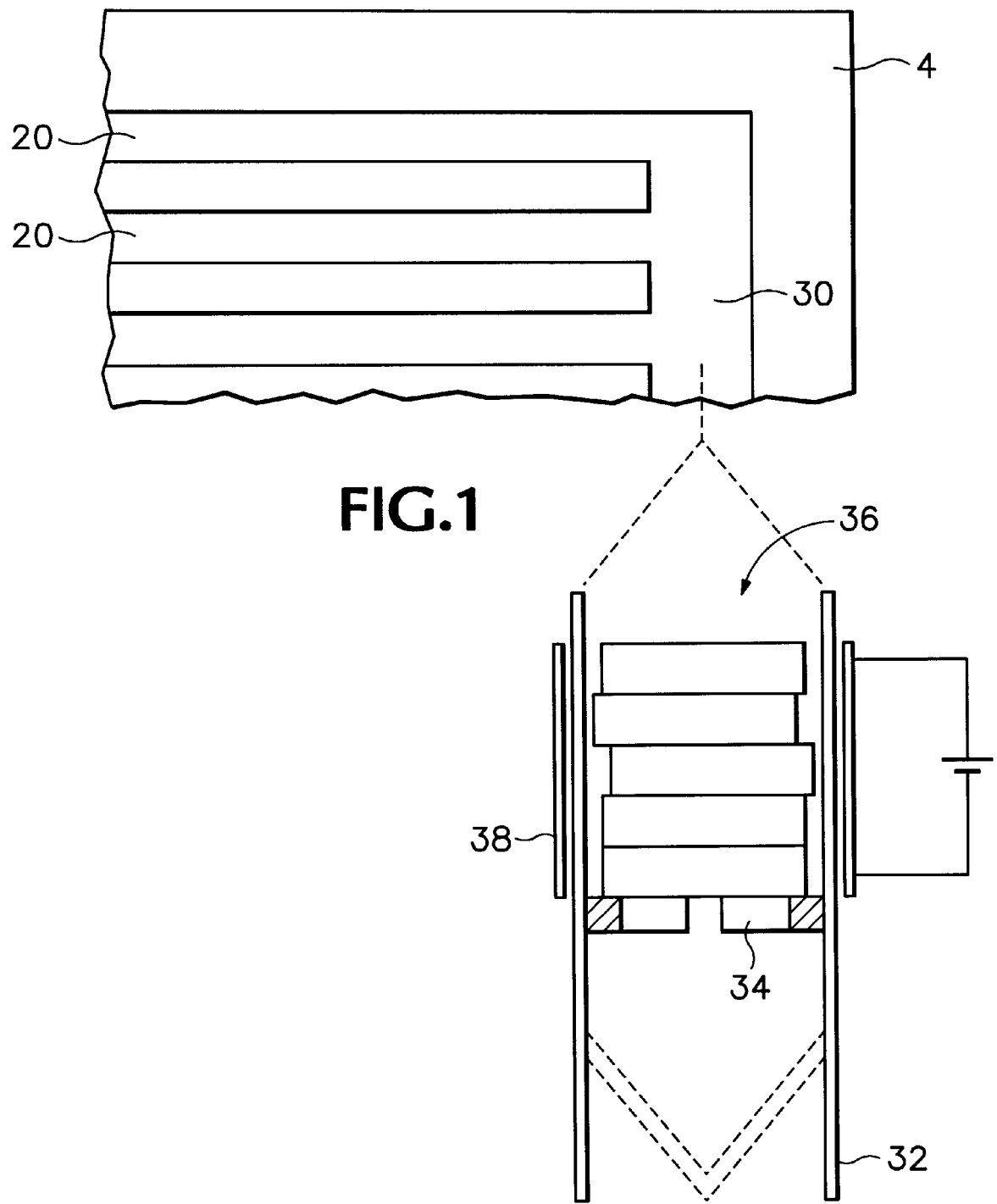
FIG. 1 is a partial schematic illustration of a PALC display panel in accordance with the present invention.

FIG. 1 shows the plasma channels 20 formed in the channel member 4 of a PALC HDTV display panel. The volume of the plasma channels 20 is about 0.05 l. The plasma channels 20 communicate with a manifold channel 30. The manifold channel communicates with a fill tube 32, which is located outside the display field and projects from the display panel. The fill tube may be made of glass. A quantity 36 of alloy St 737 is located with clearance in the fill tube. The additional free vacuum volume, contributed-by the manifold channel and the fill tube (excluding the volume occupied by the storage material) is about 2 liter. The alloy St 737 is commercially available in tablets having a mass of about 0.7 g. In the panel shown in FIG. 1, five tablets are employed. A spring 34 inside the fill tube 32 prevents the tablets from falling from the fill tube when the fill tube is disposed in a vertical orientation over equipment for exhausting gas from the panel and filling the panel with the desired gas mixture.

Figure 2:
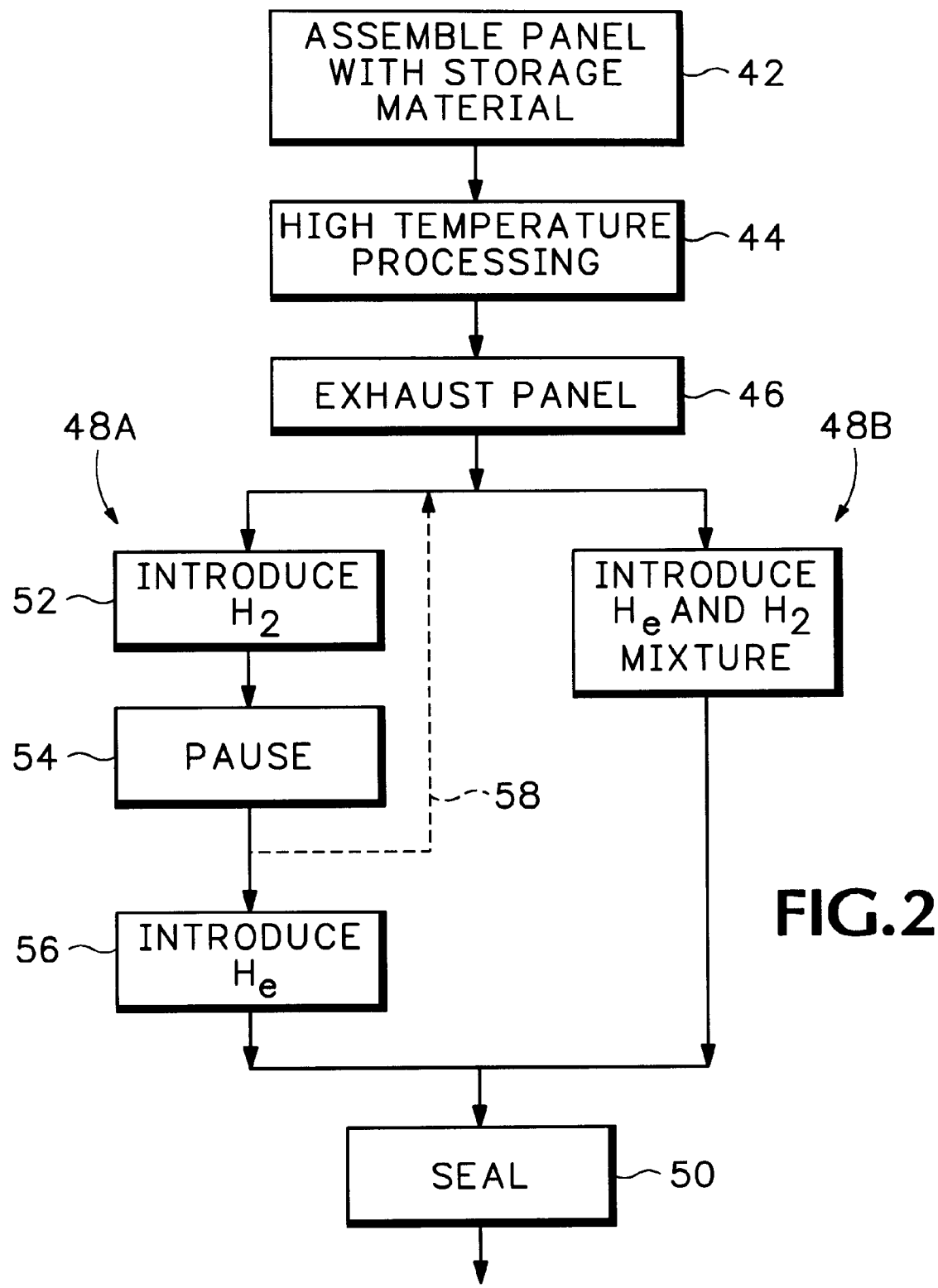
FIG. 2 is a flow chart illustrating steps in manufacture of the display panel shown in FIG. 1.

FIG. 2 shows a possible procedure for manufacturing the panel shown in FIG. 1. In accordance with step 42 of FIG. 2, the panel is assembled with the storage material in the fill tube. At this point, the alloy St 737 is preferably depleted of hydrogen. Various high temperature operations are performed (step 44) in manufacture of the panel. The panel chamber is exhausted (step 46) to a pressure below about $10^{-5}$ torr, preferably below about $10^{-7}$ torr. Hydrogen and helium are introduced into the panel (branch 48A or branch 48B), and the fill tube is sealed by fusing (step 50).

Assuming that the total pressure in the panel when the fill tube is sealed is 200 mB and that the desired partial pressure of hydrogen is in the range from 1 to 3 percent, the branch 48A shows that pure hydrogen is introduced into the panel chamber through the fill tube, for example at a pressure of about 500 mB (step 52). When sufficient hydrogen has been introduced, the supply of hydrogen is cut off and the hydrogen present in the panel chamber is partially absorbed into the storage material during a pause 54. When the pressure in the panel chamber has dropped to about 15 mB, due to absorption of hydrogen into the storage material, pure helium is introduced to a partial pressure of 194 to 198 mB (step 56). Absorption of hydrogen continues until equilibrium is reached at a partial pressure of 2 to 6 mB.

As indicated by the loop 58, it might be necessary to introduce hydrogen in several stages in order for the partial pressure of hydrogen to be at the desired level when equilibrium is attained. Thus, hydrogen is introduced at 500 mB, supply of hydrogen is cut off to allow absorption into the storage material during the pause 54, and these two steps are repeated as many times as necessary until the proper quantity of hydrogen has been introduced.

It will be appreciated that the operation of loading the storage material with hydrogen by supplying pure hydrogen to the panel chamber may be hazardous. The dangers associated with, handling of pure hydrogen can be mitigated by introducing a mixture of hydrogen and helium. As shown by branch 48B, the mixture of hydrogen and helium is introduced into the panel chamber by way of the fill tube, for example at a pressure of 900 mB, until the desired quantity of the gas mixture is present in the panel. The concentration of hydrogen in the gas mixture is selected to take into account the fact that most of the hydrogen will be absorbed into the storage material and that equilibrium should be established at a partial pressure of hydrogen at 2 mB.

Figure 3:
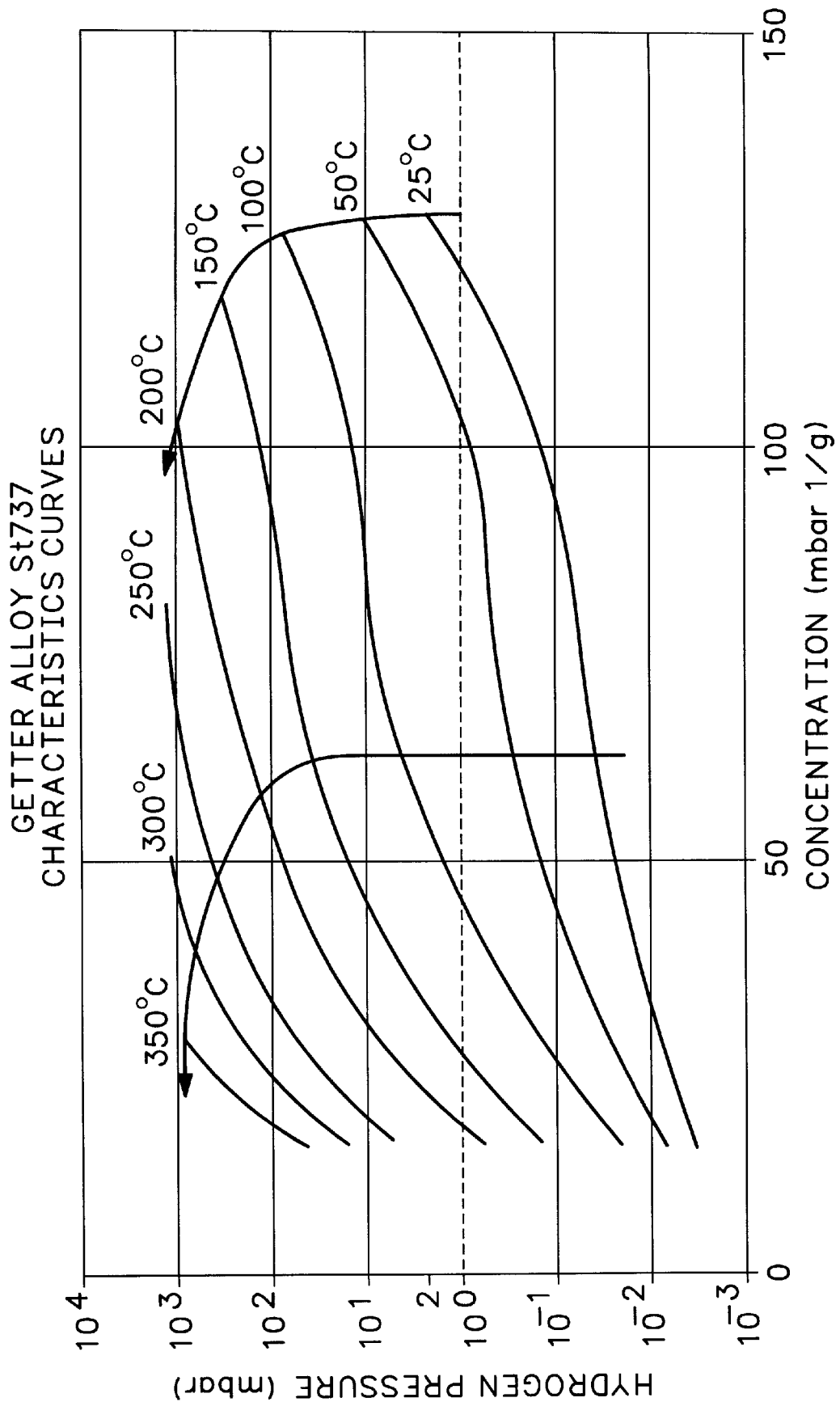
FIG. 3 is a graph illustrating characteristic curves of alloy St 737 at various temperatures.
Figure 4:
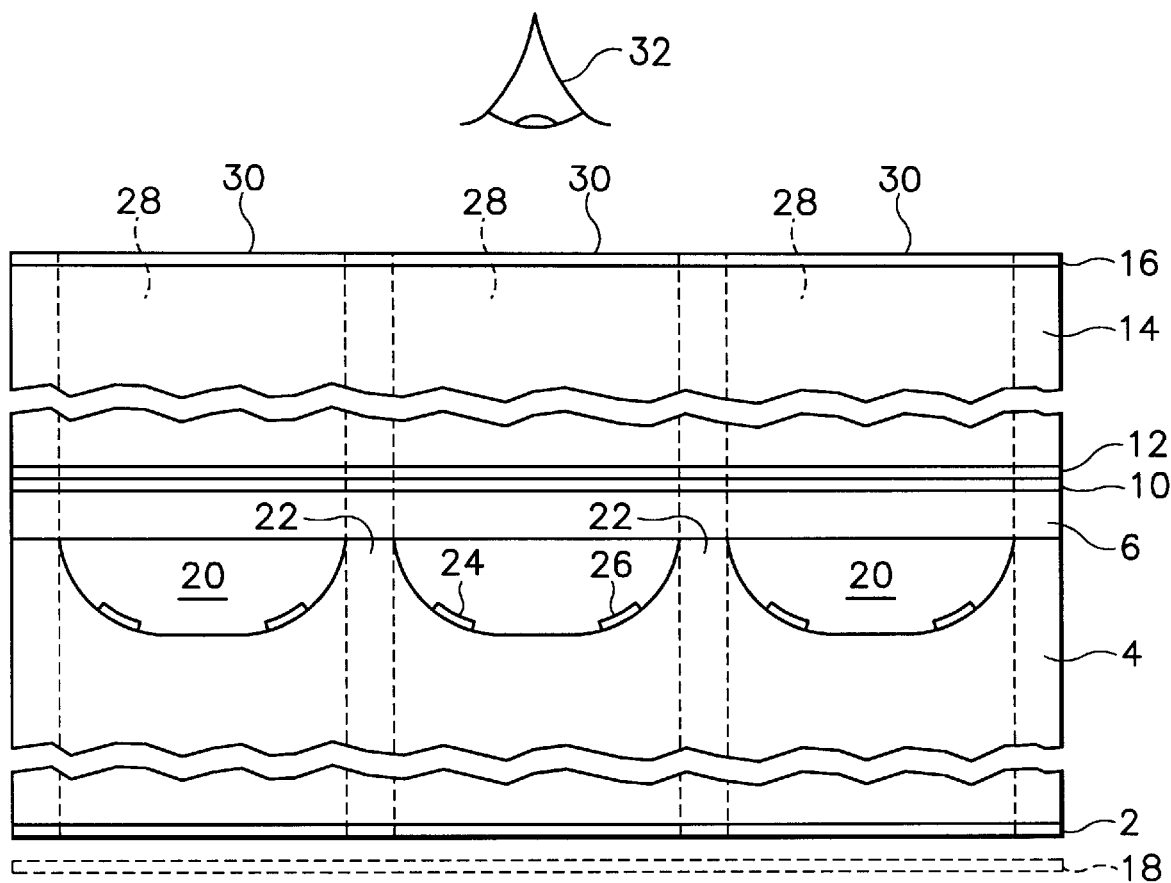
FIG. 4 is a sectional view of a PALC display panel in accordance with the prior art.

The normal operating temperature of a PALC display panel is typically in the region of 40° C. It can be inferred from the characteristic curves shown in FIG. 3 that at a temperature of 40°C., equilibrium is established between hydrogen gas at a partial pressure of 2 mB and hydrogen stored in the storage material at a concentration in the range from about 107 mB bar liter/g to about 125 mB liter/g. In order to store 500 mB liter of hydrogen, the quantity of alloy St 737 that is required would be about 4.8 grams. As hydrogen is consumed through operation of the panel, the partial pressure of hydrogen in the panel chamber will tend to fall, but this reduction in partial pressure causes a release of hydrogen from the storage material, thus limiting the reduction in partial pressure. The partial pressure of hydrogen in the panel chamber therefore remains substantially constant until the concentration of hydrogen in the storage material has fallen to the extent that it can no longer sustain the hydrogen partial pressure.

It is preferred that five tablets of storage material be employed, since accelerated life testing shows that this quantity is sufficient to maintain the partial pressure of hydrogen at at least 2 mB over 10,000 hours of operation. It will be appreciated that the operating life of the panel can be extended by increasing the quantity of storage material and thereby postponing the time at which the partial pressure of hydrogen in the panel will fall below the level sufficient to sustain the quality of the display.

An electrical resistance heater 38 is provided around the exterior of the fill tube and may be used to heat the storage material and elevate the partial pressure at which equilibrium is established between the concentration of hydrogen in the storage material and the partial pressure of hydrogen in the panel. In this manner, it is possible to achieve and maintain the desired partial pressure of hydrogen in the panel at a lower concentration of hydrogen in the storage material, so that the storage material may be initially loaded to a lower concentration. Alternatively, or in addition, use of the heater allows the time at which the partial pressure of hydrogen in the panel falls below a desired value to be delayed by increasing the temperature of the storage material, thereby prolonging the useful life of the panel.

It will be appreciated that the invention is not restricted to the particular embodiment that has been described, and that variations may be made therein without departing from the scope of the invention as defined in the appended claims and equivalents thereof.

We claim:

1. A channel subassembly for a PALC panel, comprising:
    a channel member defining an array of interconnected channels,
    a cover sheet extending over the channels and sealed to the channel member, whereby the channel member and the cover sheet define a sealed volume,
    a mixture of an ionizable gas and hydrogen in said sealed volume, and
    quantity of an alloy composed of about 33 wt % Zr, about 33 wt % Fe and about 33 wt % V in communication with the sealed volume.

2. A channel subassembly according to claim 1, having a fill tube for exhausting gas from the sealed volume and introducing gas into the sealed volume, and wherein the quantity of alloy St 737 is located in the fill tube.

3. A channel subassembly according to claim 2, wherein the channel subassembly further comprises an electrical heating resistor at the exterior of the fill tube and in thermally conductive connection therewith, for heating the quantity of alloy.

4. A channel subassembly according to claim 1, wherein hydrogen is present in said sealed volume such that it is absorbed into the quantity of alloy to a concentration of about 120 to 150 mB liter per gram of alloy.

5. A channel subassembly according to claim 1, wherein the mixture of the ionizable gas and hydrogen in said sealed volume is at a pressure of about 200 mB absolute and the hydrogen is present at a partial pressure of about 2 mB.

6. A channel subassembly for a PALC panel comprising:
    a channel member having a periphery and defining an array of parallel interconnected channels,
    a cover sheet extending over the channels and sealed to the channel member, whereby the channel member and the cover sheet define a sealed volume,
    helium in said sealed volume at a partial pressure within the range from about 50 mB to about 350 mB,
    a quantity of an alloy composed of about 33 wt % Zr, about 33 wt % Fe and about 33 wt % V in communication with the sealed volume, and
    hydrogen in said sealed volume at a partial pressure within the range from about 0.02 mB to about 36 mB.

* * * * *